US010761926B2

(12) United States Patent
Chien

(10) Patent No.: US 10,761,926 B2
(45) Date of Patent: Sep. 1, 2020

(54) SERVER HARDWARE FAULT ANALYSIS AND RECOVERY

(71) Applicant: QUANTA COMPUTER INC., Taoyuan (TW)

(72) Inventor: Wei-Yu Chien, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 159 days.

(21) Appl. No.: 16/101,749

(22) Filed: Aug. 13, 2018

(65) Prior Publication Data

US 2020/0050510 A1   Feb. 13, 2020

(51) Int. Cl.
| G06F 11/00 | (2006.01) |
| G06F 11/07 | (2006.01) |
| G06F 11/14 | (2006.01) |
| G06F 11/20 | (2006.01) |
| G06F 11/30 | (2006.01) |
| G06F 11/34 | (2006.01) |

(52) U.S. Cl.
CPC ........ *G06F 11/0793* (2013.01); *G06F 11/008* (2013.01); *G06F 11/0709* (2013.01); *G06F 11/079* (2013.01); *G06F 11/0769* (2013.01); *G06F 11/1428* (2013.01); *G06F 11/2028* (2013.01); *G06F 11/3006* (2013.01); *G06F 11/3034* (2013.01); *G06F 11/3452* (2013.01)

(58) Field of Classification Search
CPC ............... G06F 11/0793; G06F 11/008; G06F 11/0709; G06F 11/0769; G06F 11/079; G06F 11/1428; G06F 11/2028; G06F 11/3006; G06F 11/3034; G06F 11/3452; G06F 2201/86

USPC .......................................................... 714/11
See application file for complete search history.

(56) References Cited

U.S. PATENT DOCUMENTS

| 6,516,429 | B1 * | 2/2003 | Bossen ................. G06F 11/004 |
| | | | 714/10 |
| 8,332,690 | B1 | 12/2012 | Banerjee et al. |
| 10,599,504 | B1 * | 3/2020 | BeSerra ................ G06F 11/076 |
| 2006/0242288 | A1 | 10/2006 | Masurkar |
| 2008/0004841 | A1 | 1/2008 | Nakamura |

(Continued)

FOREIGN PATENT DOCUMENTS

| TW | 201235840 A | 9/2012 |
| TW | 201417536 A | 5/2014 |
| TW | 201730763 A | 9/2017 |

OTHER PUBLICATIONS

TW Office Action for Application No. 108103022, dated Sep. 6, 2019, w/ First Office Action Summary.

(Continued)

*Primary Examiner* — Yair Leibovich
(74) *Attorney, Agent, or Firm* — Nixon Peabody LLP

(57) ABSTRACT

A method and system for automatically managing a fault event occurring in a datacenter system provided. The method includes collecting hardware fault event analysis corresponding with the hardware fault event. The hardware fault event analysis is organized into a report for a server device suffering from the hardware fault event. The method also includes processing statistical data received from the report for the server device. The method also includes performing hardware recovery based on the evaluated statistical data.

17 Claims, 7 Drawing Sheets

(56) References Cited

U.S. PATENT DOCUMENTS

2014/0122930 A1    5/2014  Devale et al.
2016/0196194 A1    7/2016  Shih
2017/0046233 A1*   2/2017  Shivanna ............ G06F 11/1464
2018/0157525 A1    6/2018  Song

OTHER PUBLICATIONS

TW Search Report for Application No. 108103022, dated Sep. 6, 2019, w/ First Office Action.
Extended European Search Report for EP Application No. 19184702.9, dated Feb. 12, 2020.

* cited by examiner

SERVER HARDWARE FAULT ANALYSIS AND RECOVERY

FIELD OF THE INVENTION

The present disclosure relates generally to an automated management system and method for managing a fault event occurring in a data center.

BACKGROUND

In response to increasing demands of information based economies, data centers and information technology networks continue to proliferate across the globe. This expansion has taken on various forms, including widely distributed computer networks that link together geographically disparate computing resources, as well as data centers, which provide power, cooling, and computing infrastructure to a variety of applications.

Typical data centers contain a number of racks of equipment that require power, cooling, and connections to external communications facilities. In modern data centers and network rooms, the increased density of computing equipment used in these facilities has put strains on their associated power systems. Because this computing equipment generates heat in operation, the cooling systems of these facilities are strained as well.

As a result, an effective data center operation and management tool is required. Most conventional methods of managing a data center depend on the previous operation record. In typical data center operation and management tools, faults of the data center are manually managed. In this case, it is difficult to predict the occurrence of fault events. In addition, it is also difficult to have a proactive measure and prediction on a new type of fault event that has not previously occurred.

SUMMARY

The following is a simplified summary of one or more embodiments in order to provide a basic understanding of present technology. This summary is not an extensive overview of all contemplated embodiments of the present technology. It is intended neither to identify key or critical elements of all examples, nor to delineate the scope of any or all aspects of the present technology. Its sole purpose is to present some concepts of one or more examples in a simplified form as a prelude to the more detailed description that is presented later.

A method and system for automatically managing a fault event occurring in a datacenter system is provided. The method includes collecting hardware fault event analysis corresponding with the hardware fault event. The hardware fault event analysis is organized into a report for a server device suffering from the hardware fault event. The method also includes processing statistical data received from the report for the server device. The method also includes performing hardware recovery based on the evaluated statistical data In some embodiments of the disclosure, collecting hardware fault event analysis includes storing a hardware fault event detection system within a baseboard management controller (BMC) firmware of the server device. The method can also include identifying a source of the hardware fault event, and determining whether the hardware fault event is a result of either a correctable or non-correctable error. In some embodiments of the disclosure, the source of the hardware fault event is determined by a BIOS service routine. The method can also include identifying the hardware fault event. In some embodiments, identifying the hardware fault event can include identifying at least one of the following: fault location, fault category, fault type, and/or fault severity. The method can also include receiving a notification from a BMC of the hardware fault event identification. In some embodiments of the disclosure, the report includes a hardware fault event report and a device report. In some embodiments of the disclosure, a language-independent open data format that uses human-readable text can be received to express data objects in the report. The method can also include performing a central tendency analysis of the data in an analysis component of the report.

In some embodiments, the central tendency analysis includes analyzing the risk of an operating system and of a software service associated with the hardware fault event; analyzing an orientation of protection of the server device; and predicting trends of the hardware fault event and impact of the hardware fault event. In some embodiments, the method can also include measuring the hardware fault event and creating a risk assessment through a predictive analytics process to create a certificate of diagnosis of the hardware fault event. In some embodiments of the disclosure, performing the hardware recovery can include examining a recovery policy for the server device. The method can also include scheduling a recovery mechanism. In some embodiments, the recovery mechanism is scheduled for either instant repair or delayed repair based on the recovery policy. The process also includes monitoring the hardware fault event for any performance defects of the server device.

A system for automatically managing a hardware fault event occurring in a datacenter system is also provided. The system includes rack servers, wherein each rack server includes a server device. The system also includes a datacenter management system connected to the server device. The datacenter management system is configured to collect hardware fault event analysis corresponding with the hardware fault event. The hardware fault event analysis is organized into a report for the server device suffering from the hardware fault event. The datacenter management system is also configured to process statistical data received from the report for the server device and perform hardware recovery based on the evaluated statistical data.

Additional features and advantages of the disclosure will be set forth in the description that follows, and in part, will be obvious from the description, or can be learned by practice of the principles disclosed herein. The features and advantages of the disclosure can be realized and obtained by means of the instruments and combinations particularly pointed out in the appended claims. These and other features of the disclosure will become fully apparent from the following description and appended claims, or can be learned by the practice of the principles set forth herein.

BRIEF DESCRIPTION OF THE DRAWINGS

In order to describe the manner in which the above-recited disclosure and its advantages and features can be obtained, a more particular description of the principles described above will be rendered by reference to specific examples illustrated in the appended drawings. These drawings depict only example aspects of the disclosure, and are therefore not to be considered as limiting of its scope. These principles are described and explained with additional specificity and detail through the use of the following drawings.

DETAILED DESCRIPTION

Figure 1:
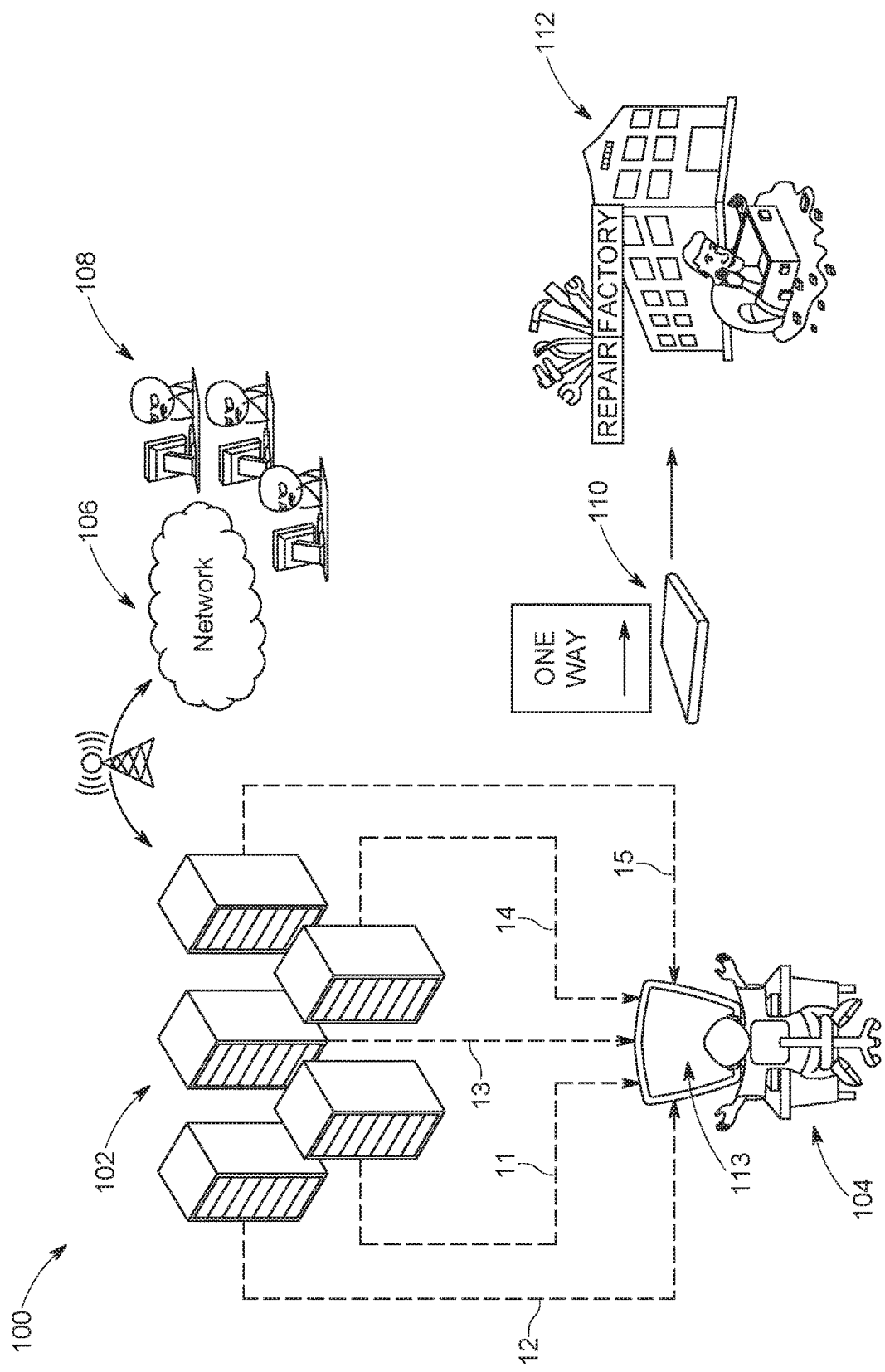
FIG. 1 illustrates a traditional data center system 100.

The present invention is described with reference to the attached figures, where like reference numerals are used throughout the figures to designate similar or equivalent elements. The figures are not drawn to scale, and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As discussed above, in typical data center operation and management tools, faults of the data center are manually managed. In this case, it is difficult to predict the occurrence of fault events. In addition, it is also difficult to have a proactive measure and prediction on a new type of fault event that has not previously occurred. The present disclosure provides a system and corresponding method for automatically managing a fault event occurring in a data center. The disclosed systems and methods can perform server hardware faults analysis and provide a recovery mechanism. The recovery mechanism can be configured to reduce server downtime and mitigate any software affected from the hardware fault event without replacement. The recovery mechanism can also schedule a diagnosis of the root cause of the server hardware fault events without the requiring a manufacturer's repair or recovery.

FIG. 1 illustrates a traditional data center system 100. The data center system 100 can include thousands of rack servers 102. The data center system 100 can also include an on-site administrator 104 configured to monitor errors received from the rack servers 102. Specifically, the administrator 104 can receive errors from the numerous electronic components stored within the rack servers 102 through a user interface of a datacenter management system 113. The electronic components can include server devices. An exemplary server device 110 is shown herein. The errors associated with the server device 110 can include storage errors 11, CPU errors 13, memory errors 14, power supply errors 12, or input/output errors 15. These errors are for exemplary purposes, and by no means are intended to be an exhaustive list of errors. In some cases, there can be thousands of hardware errors produced in a consecutive report for the administrator 104 from the rack servers 102.

The data center system 100 can also include customers 108 located at remote locations. The customers 108 can access the rack servers 102 over network 106. The network 106 can be a LAN (local area network) or WAN (wide-area network) configured to connect the customers 108 to the rack servers 102. In many cases a defective hardware (e.g., server device 110) can directly affect the performance of the rack servers 102. As a result, the performance of the rack servers 102 as experienced by the customers 108 is directly affected. As a result, the administrator 104 is tasked with resolving hardware fault events within the rack servers 102 as fast as possible. In the event the administrator 104 is unable to service or repair a hardware fault event the server device 110, the server device 110 is sent to a manufacturer 112 to be repaired or replaced. For the purposes of this example, the manufacturer 112 is remote from the rack servers 102 and the administrator 104. Service on the server device 110 by the manufacturer 112 can often take days, weeks or months. Therefore, the traditional approach of solely employing administrators to troubleshoot hardware fault events is not an ideal solution.

Traditionally, the datacenter management system 113 can detect 98% of hardware fault events during a validation phase and eliminate the faults by improving hardware and firmware design. A remaining 1% of hardware fault event is a result of aging hardware. Thus, this type of hardware fault event is typically unpredictable and difficult to detect. The hardware fault events are detectable and reportable through the datacenter management system's 113 robust reliability, availability and serviceability (RAS) feature. The reliability feature of the datacenter management system 113 is able to avoid, detect and recover hardware fault events. The availability feature of the datacenter management system 113 is configured to mitigate hardware fault events and reduce downtime of any associated software. The serviceability feature of the datacenter management system 113 is configured to diagnose the system when problems arise.

The remaining 1% of hardware fault events of a server are not as predicable. In fact, these hardware fault events are typically new and undiscovered. As a result, hardware designers have never run a simulation to account for the hardware fault events. These unexpected hardware fault events may crash the server device 110, or corrupt the integrity of an associated operating system. Eventually the hardware fault event may require significant downtime and seriously impact the customer 108 where there is no existing methodology to perform a troubleshoot analysis recovery.

Figure 2:
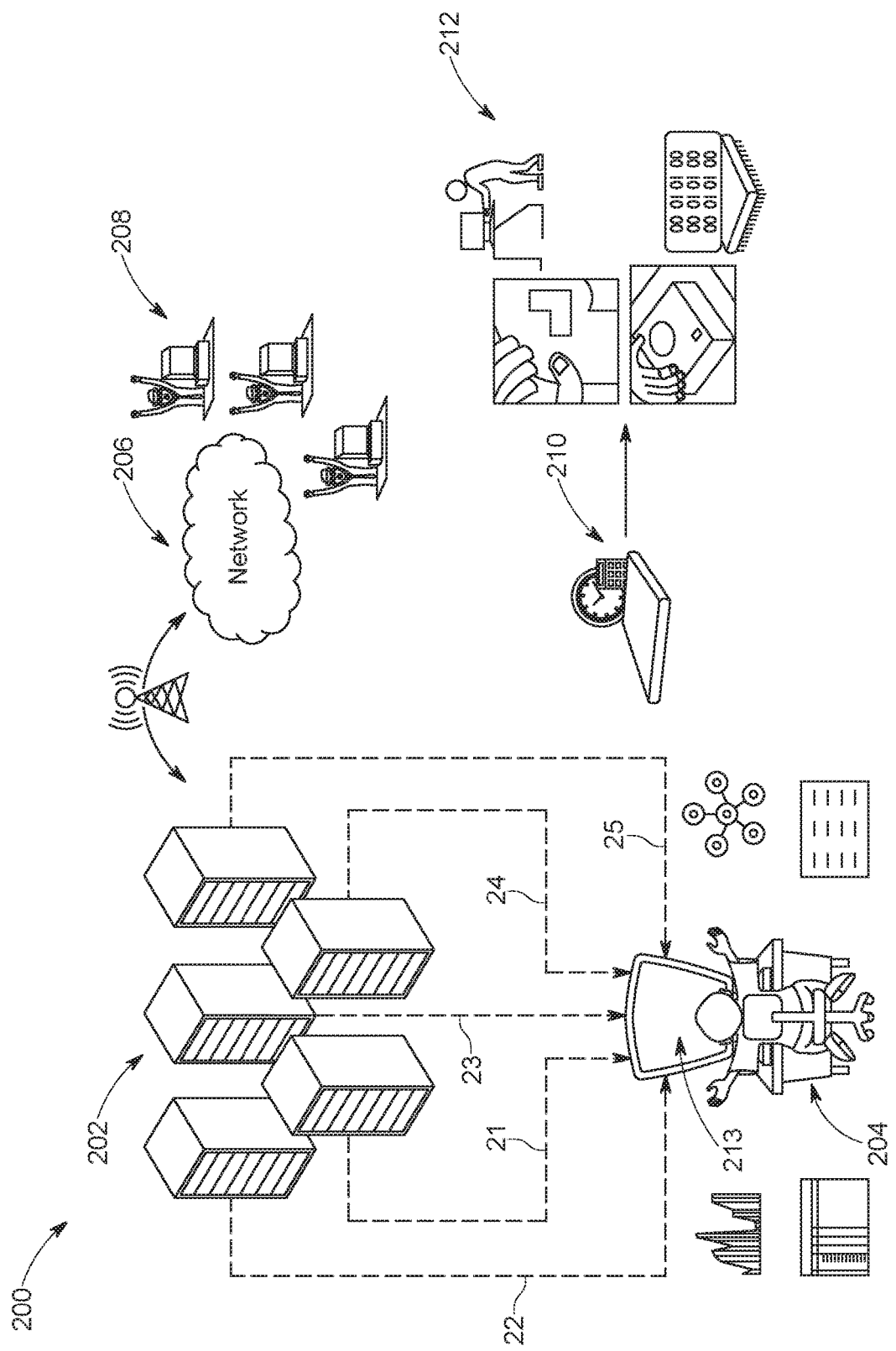
FIG. 2 illustrates an exemplary data center system 200, in accordance with an implementation of the present disclosure.

FIG. 2 illustrates an exemplary data center system 200. The data center system 200 can provide an administrator a usable report, and predict fault and feasible recovery mechanism in datacenter. This can allow an administrator the ability to mitigate any problems associated with a server, reduce sever downtime and maintain service of the server. The data center system 200 can include thousands of rack servers 202. The data center system 200 can also include an on-site administrator 204 configured to monitor errors received from the rack servers 202. Specifically, the administrator 204 can receive errors from the numerous electronic components stored within the rack servers 202 through the user interface of a datacenter management system 213. The electronic components can include server devices. An exemplary server device 210 is shown herein. The server device 210 can include a compute server, storage server or a network switch server. The errors associated with a hardware fault event of the server device 210 can include storage errors 21, CPU errors 23, memory errors 24, power supply errors 22, or input/output errors 25. These errors are for exemplary purposes, and by no means are intended to be an exhaustive list of errors. In some cases, there can be thousands of hardware errors produced in a consecutive report for the administrator from the rack servers 202.

The data center system 200 can also include customers 208 located at remote locations. The customers 208 can access the rack servers 202 over network 206. The network 206 can be a LAN (local area network) or WAN (wide-area network) configured to connect the customers 208 to the rack servers 202. In the event the administrator 204 is unable to service or repair a hardware fault event the server device 210, an IT engineer 212 can service the server device 210.

Figure 3:
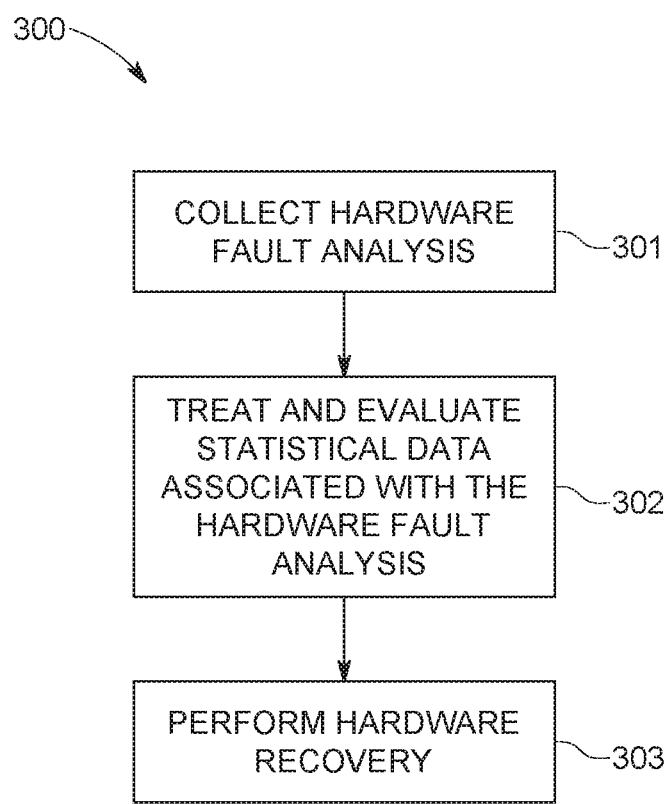
FIG. 3 depicts a flow chart describing the process 300 for automatically managing a fault event occurring in the data center system 200, in accordance with an implementation of the present disclosure.

FIG. 3 depicts a flow chart describing the process 300 for automatically managing a fault event occurring in the data center system 200. The following description of the process 300 is described in detail with reference to the components of the data center system 200 of FIG. 2. The process 300 begins at step 301, where the datacenter management system 213 collects the hardware fault event analysis. This is discussed in detail with respect to FIG. 4. At step 302, the datacenter management system 213 treats and evaluates the statistical data associated with the hardware fault event analysis. This is discussed in detail with respect to FIGS. 5A and 5B. Finally, at step 303, the datacenter management system 213 performs hardware recovery. This is discussed in detail with respect to FIG. 6.

Figure 4:
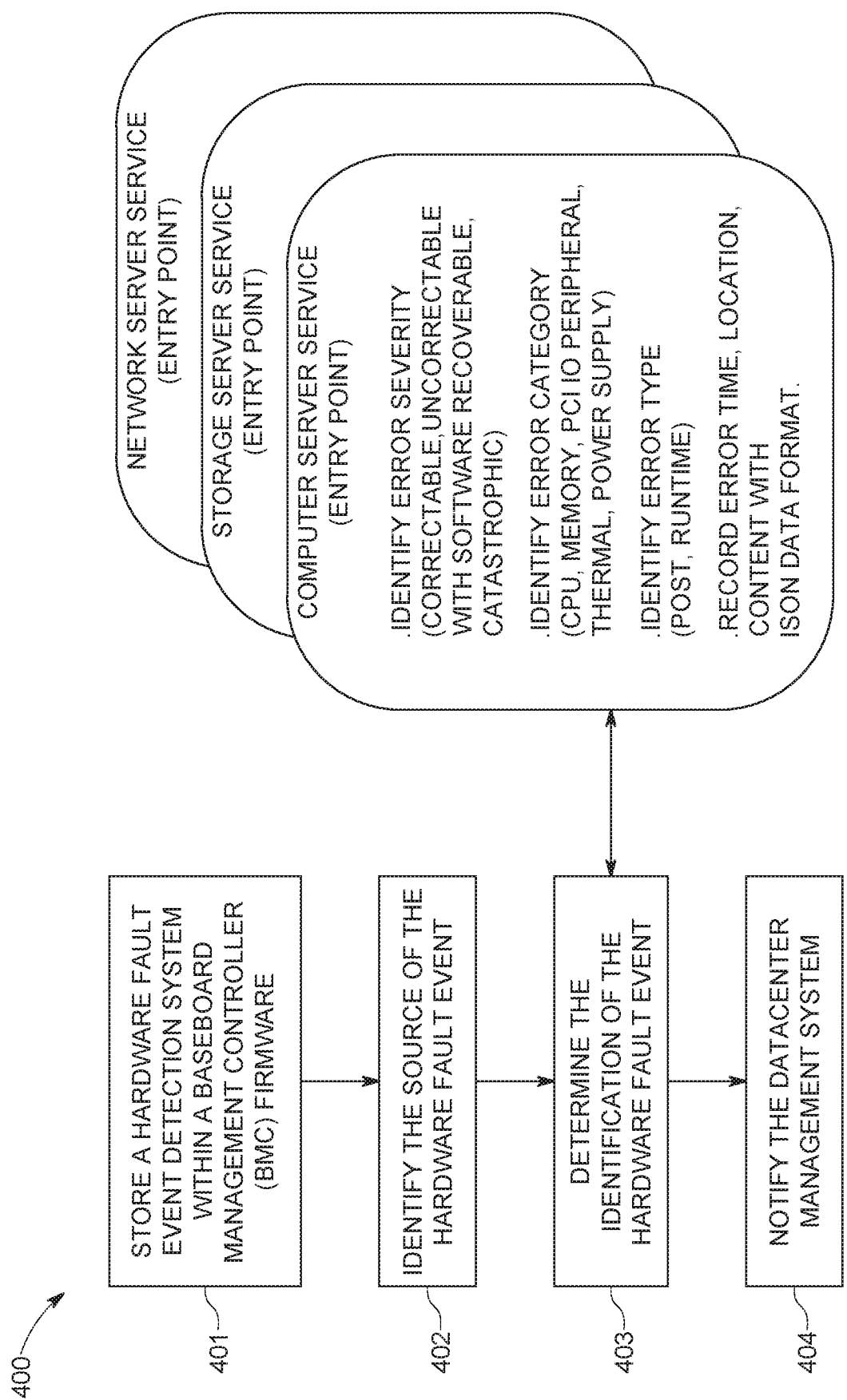
FIG. 4 depicts a flow chart describing the process 400 for collecting hardware fault event analysis, in accordance with an implementation of the present disclosure.

FIG. 4 depicts a flow chart describing the process 400 for collecting hardware fault event analysis. The following description of the process 400 is described in detail with reference to the components of the data center system 200 of FIG. 2. The process 400 starts at step 401, where a hardware fault event detection system is stored within a baseboard management controller (BMC) firmware. Each of the server devices within the rack servers 202, for example server device 210, can have a BMC firmware installed. The BMC firmware can be configured to connect with the datacenter management system 213. In alternative embodiments, the hardware fault event detection system can be installed in a unified extensible firmware interface (UEFI), a basic input/output system (BIOS), a rack manager (RM) software or within the datacenter management system 213 itself.

At step 402, the source of the hardware fault event can be identified. The hardware fault event can be the result of a hardware error that is either correctable or uncorrectable. A hardware uncorrectable error can be separated into two categories: software recoverable error or catastrophic error. A software recoverable error indicates that at least some data in the server device 210 is corrupted. As a result, this data cannot be recovered. However, when this type of error occurs, the operating system is still valid, and the software can be recovered without a system reset and without disturbing other processes in progress. In contrast, a catastrophic error indicates a processor is not able to execute micro-instructions. A catastrophic error also requires a system reset and disturbs other processes in progress. These errors are classified as correctable errors, although they require a system reset. In comparison, correctable errors refer to error data could be fixed by hardware mechanism such as cyclic redundancy check (CRC). In some embodiments, correctable errors do not require a system reset.

In some embodiments, the hardware fault event can be recognized by a BIOS service routine. In some embodiments, the BIOS service routine can implement a system management interrupt (SMI) signal triggering. At step 403, the identification of the hardware fault event can be determined. The error triggering can be achieved by a hardware signal, such as SMI, SCI, NMI, SMBus alert, or CATERR interrupt. For example, the fault's location, category, fault type, severity, identification can be recorded and forward into a permanent storage of the BMC. In some embodiments, the identification of the hardware fault event can be determined through an existing interface such as a system management bus (SMBus), a Platform Environment Control Interface (PECI) or a Joint Test Action Group (JTAG). Each of these buses or interfaces provide a communication mechanism between the hardware components and the BMC. At step 404, the BMC can notify the UEFI, the BIOS, the RM software or the datacenter management system 213.

Figure 5A:
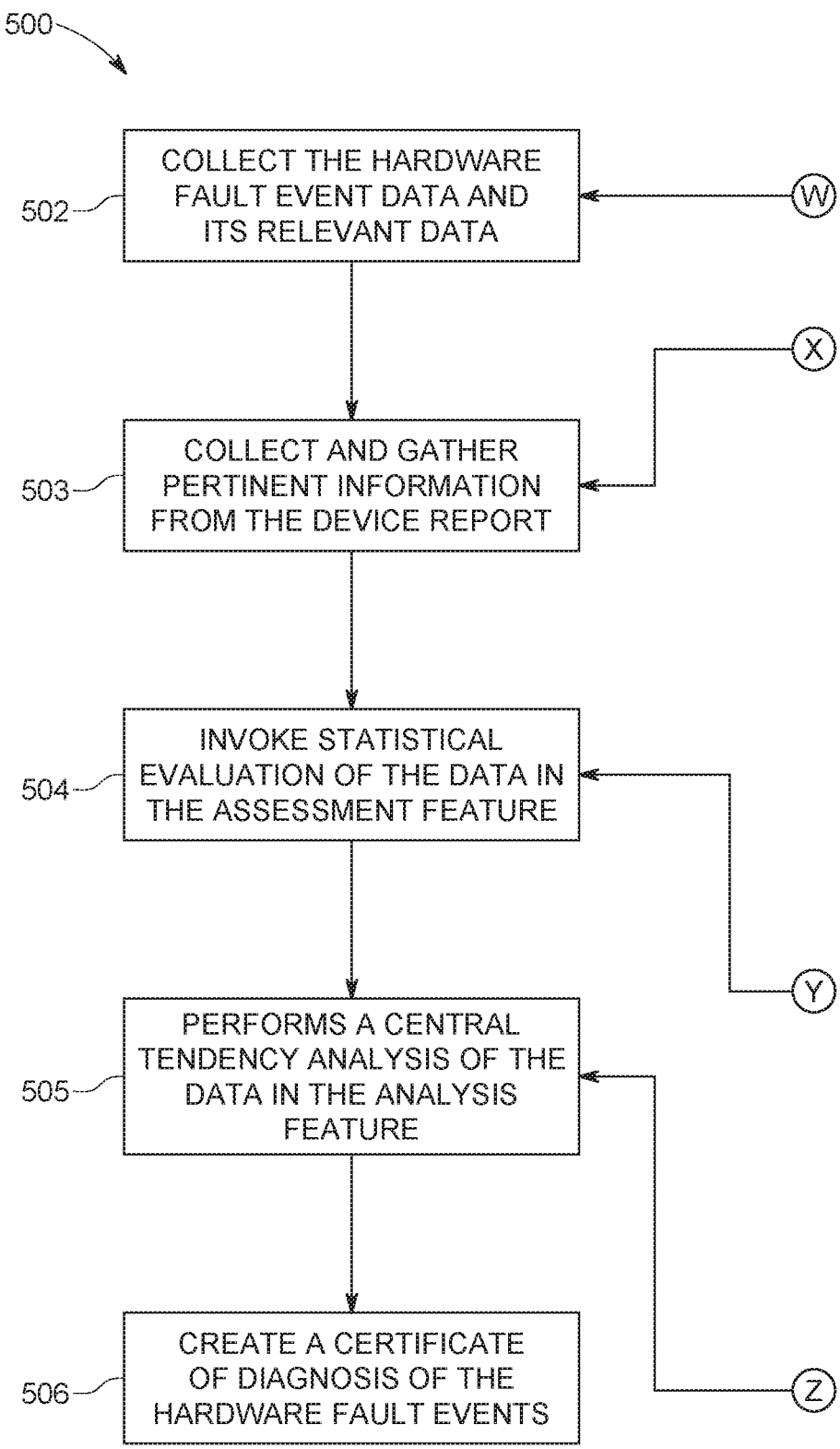
FIGS. 5A and 5B depict a flow chart describing the process 500 for treating and evaluating statistical data, in accordance with an implementation of the disclosure.
Figure 5B:
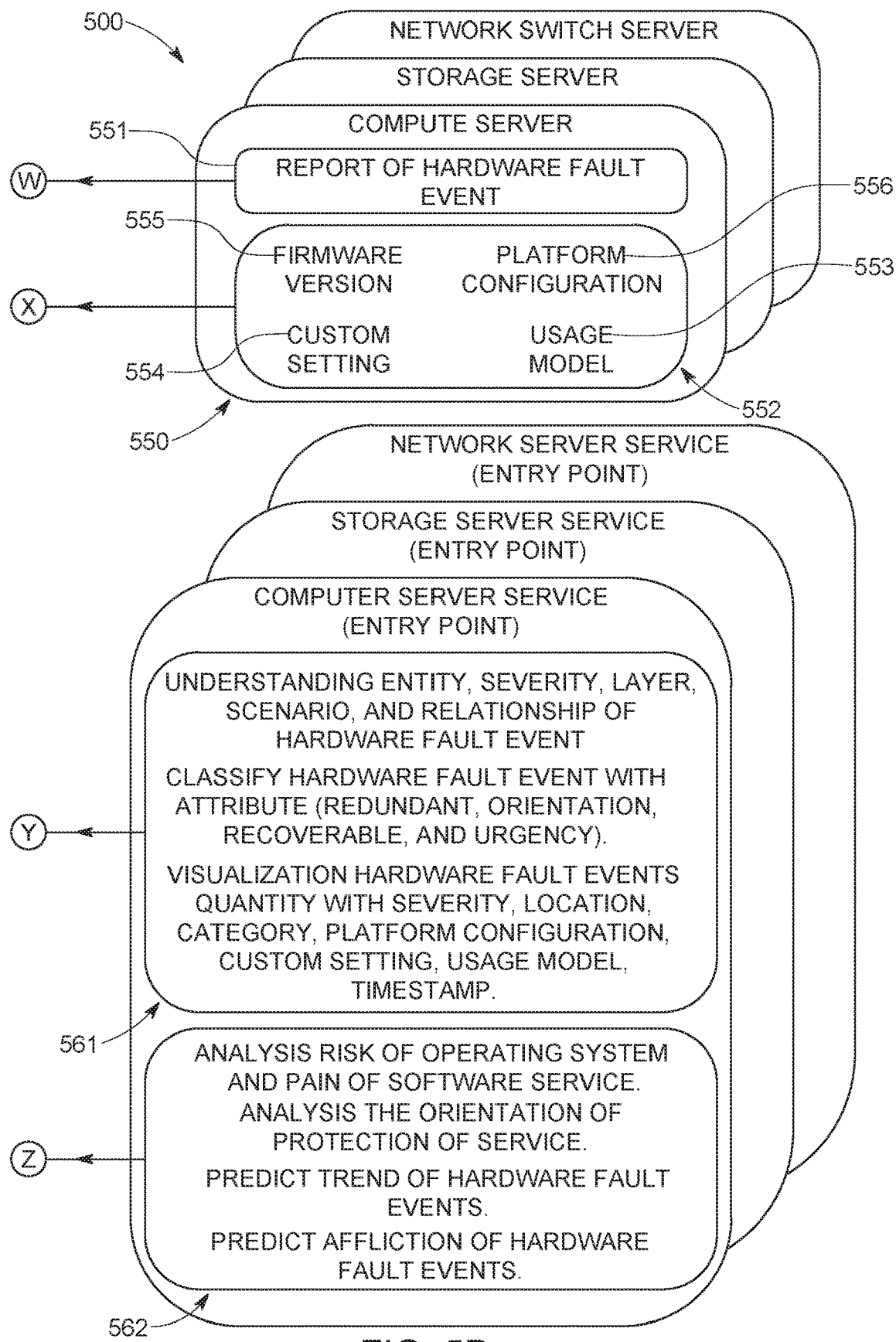

FIGS. 5A and 5B depict a flow chart describing the process 500 for treating and evaluating statistical data. The following description of the process 500 is described in detail with reference to the components of the data center system 200 of FIG. 2. Hardware fault events can include a large volume of varying data. In order to evaluate the data associated with the hardware fault events, the datacenter management system 213 is configured to gather data from multiple locations, process the data and initiate the processing and recovery stage of the server device 210 based on the data. The process 500 starts at step 502, where the hardware fault event data and its relevant data can be collected. The hardware fault event data can be organized into a report 550 for each server. As shown in FIGS. 5A and 5B, there can be a separate report 550 for a compute server, storage server, or network switch server. The report 550 for each server device can include a hardware fault event report 551 and a device report 552. The device report 552 can include various data as it pertains to the server device 210. For example, the device report 552 can include the firmware version 555 of the server device 210, the platform configuration 556 of the server device 210, the custom setting 554 of the server device 210, and the usage model 553 of the server device 210. One of ordinary skill in the art would understand this listing of data in the device report 552 is provided as an exemplary and is not meant to be exhaustive.

The process advances to step 503, where pertinent information from the device report 552 is collected and gathered. Examples of report 550 for a compute server, storage server, or a network switch server is shown below with respect to Table 1:

TABLE 1

| Data collection | Product | | |
| --- | --- | --- | --- |
| | Compute server | Storage server | Network switch server |
| Error format | Category (CPU, Memory, Bus, IO peripheral, thermal, power supply) | Category (storage controller, storage manager board, storage backplane, | Category (Switch controller, switch manager board, thermal, power supply) |

TABLE 1-continued

| Data collection | Compute server | Storage server | Network switch server |
|---|---|---|---|
| | Time (Year, month, day, hour, minute, second)<br>Type (POST, runtime)<br>Severity (Correctable, uncorrectable non-fatal, uncorrectable fatal)<br>Location (Socket, channel, riser, slot, bus, device, function)<br>Identity (GPGPU, FPGA, x86, ARM) | storage drive, thermal, power supply)<br>Time (Year, month, day, hour, minute, second)<br>Type (POST, runtime)<br>Severity (Correctable, uncorrectable non-fatal, uncorrectable fatal)<br>Location (Socket, channel, slot, bus, device, function)<br>Identity (SSD storage, hard disk, NVMe,) | Time (Year, month, day, hour, minute, second)<br>Type (POST, runtime)<br>Severity (Correctable, uncorrectable non-fatal, uncorrectable fatal)<br>Location (Port)<br>Identity (protocol, size, discard, alignment error) |
| Firmware Version | UEFI BIOS image (CPU microcode, silicon reference code, $3^{rd}$ root of trust UEFI driver)<br>BMC image<br>CPLD image<br>Voltage regular image<br>$3^{rd}$ parity UEFI driver | UEFI BIOS image (CPU microcode, silicon reference code, $3^{rd}$ root of trust UEFI driver) (option)<br>Boot code (option)<br>BMC image<br>CPLD image<br>Voltage regular image<br>Backplane image<br>Storage manager board image | UEFI BIOS image (CPU microcode, silicon reference code, $3^{rd}$ root of trust UEFI driver) (option)<br>Boot code (option)<br>BMC image<br>CPLD image<br>Voltage regular image<br>Switch manager board image |
| Configuration | Quantity (CPU, memory, IO adaptor card, storage, FAN, power supply)<br>Serial number and asset tag (CPU, memory, IO adaptor card, storage, FAN, power supply)<br>Topology of compute server architecture (hierarchical & connection) | Quantity (storage, FAN, power supply)<br>Serial number and asset tag (storage controller, storage, FAN, power supply)<br>Topology of storage server architecture (hierarchical & connection) | Quantity (Switch controller, FAN, power supply)<br>Serial number and asset tag (FAN, power supply)<br>Topology of switch server architecture (hierarchical & connection) |
| Custom setting | UEFI BIOS<br>BMC<br>$3^{rd}$ parity UEFI driver (RAID function) | UEFI BIOS (option)<br>Boot code (option)<br>BMC<br>Storage Partition (aggregate & disaggregate) | UEFI BIOS (option)<br>Boot code (option)<br>BMC<br>Partition of network domain |
| Usage | Operating system (Windows, VMware, Linux)<br>Virtualization | Operating system (Windows, VMware, Linux) | Operating system (Windows, VMware, Linux) |

As indicated in Table 1, specific metrics for each server device 210 can be provided. In Table 1, the server device 210 can include a compute server, storage server or a network switch server. An exemplary metric for each server device 210 can include Data Collection and Product Error Format. This can include the category, time, type, severity, location and identity of the error. For example, an error may be in the CPU memory of the compute server. The time, type, severity, location and identity of the CPU memory error can be provided herein. Other metrics for each server device 210 can include the Firmware Version, the Configuration, the Custom Setting and the Usage information.

The server device 210 can have a BMC. The BMC for the server device 210 can provide storage for both hardware fault event and its pertinent raw data collection. The BMC of the server device 210 can also deliver a language-independent open data format that uses human-readable text to express data objects for the administrator's 204 convenience.

The statistical data in the report 550 can be used to create a statistical evaluation of the data for each server type. This statistical evaluation can include an assessment feature 561 and an analysis feature 562. At step 504, the datacenter management system 213 can invoke statistical evaluation of the data in the assessment feature 561. The assessment feature 561 can include the entity associated with the hardware fault event, the severity of the hardware fault event, the layer, and relationship data associated with the hardware fault event. The assessment feature 561 can also include hardware a fault classification. The hardware fault event can be classified as redundant, orientation, recoverable or urgency. Finally, the assessment feature 561 can include the hardware fault event quantity, the severity of the hardware fault event, the location of the hardware fault event, the category of the hardware fault event, the platform configuration, the custom setting, the usage model and a timestamp of the hardware fault event. It should be understood by one of ordinary skill in the art that the assessment feature 561 can be provided with numerous attributes, and the attributes listed herein are for exemplary purposes and are not intended to be exhaustive.

At step 505, the datacenter management system 213 performs a central tendency analysis of the data in the analysis feature 562. The central tendency analysis focuses on uncorrectable error (non-fatal). Although a non-fatal uncorrectable error can be recoverable by a software restart or hardware re-transaction, it may impact the performance of the server. The central tendency analysis includes identifying a location of the uncorrectable error and determining how many devices are connected. The central tendency analysis also includes identifying an error report from a hardware component and whether a transaction could be re-routed to an alternative device. At this point, all redundancy components configured to replace fault hardware can be listed. A determination is made as to whether a software service could be migrated to an alternative virtual machine. The error history, ratio and usage model is examined. Furthermore, the error type of the hardware fault event, the list quantity of hardware fault event, and the impact from this hardware fault event is determined. The datacenter management system 213 can analyze risk of the operating system, and of the software service associated with the hardware fault event. The datacenter management system 213 can also analyze the orientation of protection of the server device 210. The datacenter management system 213 can also predict trends of the fault event s and impacts of the hardware fault events. The datacenter management system 213 can process statistical hardware fault event data with its pertinent data to understand the hardware fault event data in distinct patterns. Furthermore, the datacenter management system 213 is configured to measure the hardware fault event and create a risk assessment through a predictive analytics process.

Based on the assessment by the datacenter management system 213 during steps 504 and 505, the datacenter management system 213 can create a certificate of diagnosis of the hardware fault events at step 506. An exemplary certificate of diagnosis is provided below in Table 2:

hardware fault event, the amount of hardware fault event location, the amount of hardware product, the amount of hardware fault event configuration per hardware fault event, the amount of software configuration per hardware fault event, and the ratio and interval of hardware fault event. The description of each of these metrics is also provided in the certificate of diagnosis. As simple hardware fault event could not point to real root cause, the quantity of error history with an associated condition is calculated. A determination is made to determine what relationship might have caused the fault between each components. An identification is made as to whether the fault is from a specific platform configuration, component, firmware version, or usage mode.

TABLE 2

| Software Service | Subject | Description of process |
|---|---|---|
| Understanding | Root | Entity of hardware fault. (CPU, memory, IO peripheral, chipset, voltage regulator, power supplier, UPS, FAN) |
| | | Severity of hardware fault. (Correctable, non-fatal, fatal error) |
| | | Source of hardware fault. (Physical layer, data layer, transaction layer, power supply, temperature over threshold) |
| | | Scenario of hardware fault. (Heavy workload, light workload, idle, power saving) |
| | | Relationship of hardware fault. (Independent component, associate with other entity). |
| | Attribute | Redundant of hardware fault component. (Power supply, FAN, spare of memory, dual link of network, dual link of CPU bus, spare of storage) |
| | | Orientation of hardware fault. (be able to workaround by software, bug fixed through firmware upgrade) |
| | | Recoverable of hardware fault. (Be able to downsize, down speed, firmware downgrade, link width down, disable, reset, reinitialize) |
| | | Urgency of hardware fault.(Emergency with hardware & software action, general with software action, schedule with software action) |
| Visualizing | Quantity | Amount of hardware fault severity. (Correctable, non-fatal, fatal error) |
| | | Amount of hardware fault. (Unique or compound error) |
| | | Amount of hardware fault location. (Physical location, slot, socket, category) |
| | | Amount of hardware product. (Compute, storage, network switch, vendor) |
| | | Amount of hardware configuration per hardware fault. (Combination of commodity, motherboard SKU) |
| | | Amount of software configuration per hardware fault, (Custom setting, firmware revision, operating system and usage) |
| | | Ratio & interval of hardware fault. (by quarter, month, day, hour, minute, second) |
| Predictive analytics | Risk assessment | Trend of hardware fault. (Persistent, dynamically happening, intermittent, one shot) |
| | | Orientation of protection. (Server shutdown automatically by hardware circuit protection, performance dropping automatically by hardware circuit protection, operating system blue screen with crash dump by hardware non-mask interrupt triggering) |
| | | Risk of operating system. (kernel crash, cloud software service sluggishness, customer's data lost and corrupted) |
| | | Affliction of hardware fault. (Damage to rest hardware circuit due to overheat, server may be not able to power on due to consecutive hardware fault) |
| | | Pain of software (Cloud service stopping, slacking, lag of response due to many retry after correctable error happened) |

As indicated in Table 2, the certificate of diagnosis can include a software service that includes an understanding, a visualizing, and a predictive analytics component. The understanding component can determine the root cause of the hardware fault event. In some embodiments, the root cause of the hardware fault event can include the entity of the hardware fault event, the severity of the hardware fault event, the source of the hardware fault event, a scenario of the hardware fault event and a relationship of the hardware fault event. The understanding component can also include an attribute component of the hardware fault event. The attribute component can include the redundant of the hardware fault event component, the orientation of the hardware fault event, a recoverable process of the hardware fault event, and an urgency of the hardware fault event. The description of each of these metrics is also provided in the certificate of diagnosis.

The visualizing component can provide quantity metrics of the hardware fault event. The quantity metrics can include the amount of hardware fault event severity, the amount of The predictive analytics component can perform a risk assessment analysis. The risk assessment analysis can include the trend of the hardware fault event, the orientation of protection, the risk of the operating system, the affliction of the hardware fault event, and the pain of the hardware. The description of each of these metrics is also provided in the certificate of diagnosis.

Figure 6:
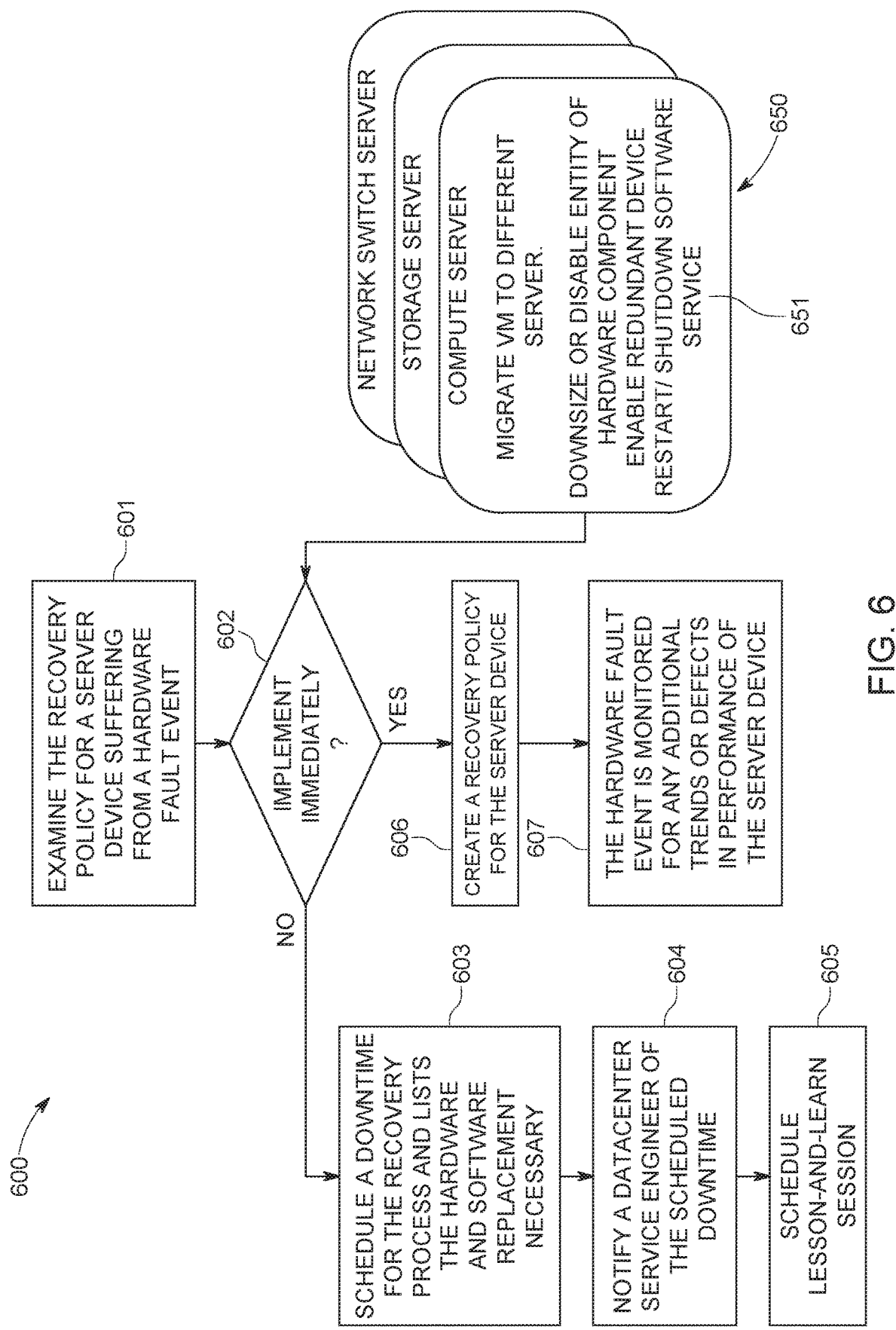
FIG. 6 depicts a flow chart describing the process 600 for hardware recovery, in accordance with an implementation of the disclosure.

FIG. 6 depicts a flow chart describing the process 600 for hardware recovery. The following description of the process 600 is described in detail with reference to the components of the data center system 200 of FIG. 2. After mining and analyzing thousands of hardware fault event data, the datacenter management system 213 is configured to determine corrective elements, such as, whether cloud service recovery is feasible and the present danger of the hardware fault event. Furthermore, the datacenter management system 213 is able to predict any potential risk using predictive analytics in order to mitigate the impact of the hardware fault event to software performance. In some embodiments, the hardware design of the motherboard on the server device 210 can have redundant circuit for primary components. As a result, the motherboard of the server 210 can provide a spare entity that allows the server to move the operations of one failed component to a normal component. In the event of an unavoidable hardware fault event, an optional circuit can reduce the scale of the server usage.

The process 600 starts at step 601, where the datacenter management system 213 examines the recovery policy for a server device 210 suffering from a hardware fault event. The recovery policy can be specific for the type of hardware fault event. Table 3 is provided below with exemplary hardware fault events and their methodology of recovery:

TABLE 3

| Product | Hardware Fault | Methodology of recovery | Owenership |
|---|---|---|---|
| Computer server | CPU bus error | Downsize link width. Disable unusable link. | UEFI firmware |
| | CPU internal error | Disable unusable Core. | UEFI firmware |
| | Memory error | Reserve space of fault memory as unavailable. Disable memory through memory controller. | UEFI firmware |
| | PCIo peripheral IO device error | Disable link between device and its root port. Down link speed. | UEFI firmware |
| | Storage drive error | Disable link between drive and its controller. | UEFI firmware |
| | Server feature malfunction | Upgrade/downgrade UEFI firmware. | Datacenter manager software |
| Storage server | Controller internal error | Disable link between controller and it host server | Datacenter manager software |
| | Storage driver error | Disable link between drive and its controller | Datacenter manager software + Storage server application |
| Network switch server | Port link down | Disable fault port and enable redundant port. | Network Switch server application |
| Power supply | Redundant power supply error | Replace and reinstall power supply. | Datacenter manager software + Human operating |
| FAN | Less than specific duty cycle | Replace and reinstall FAN module. | Datacenter manager software + Human operating |

As shown in Table 3, the report includes the hardware fault event's location, the hardware fault event type, the recovery methodology, and the software associated with the hardware fault event. The datacenter management system 213 receives the hardware fault event report from the server device 210, and initiates statistical data treatment and evaluation. The process 600 advances to step 602 where a determination is made as to whether the recovery mechanism should be implemented immediately. If it is determined that the recovery mechanism should not be implemented immediately, the process 600 advances to step 603. At step 603, the datacenter management system 213 schedules a downtime for the recovery process and lists the hardware and software replacement necessary during the recovery process. The process 600 then advances to steps 604 and 605, where the datacenter management system 213 notifies a datacenter service engineer of the scheduled downtime. A lesson-and-learn session can be scheduled for the design team. The technical feedback could improve future platform hardware design, add necessary protect circuit and adjust software algorithm of troubleshooting.

If it is determined that the recovery mechanism should be implemented immediately, the process 600 advances to step 606. At step 606 the datacenter management system 213 creates a recovery policy 651 for the server device 650. The administrator 204 (shown in FIG. 2) can create an individual recovery policy 651, and execute it to mitigate the impact of the cloud service and performance from the hardware fault event. An exemplary recovery policy 651 is shown in FIG. 6. The process 600 then advances to step 607 where the hardware fault event is monitored for any additional trends or defects in performance of the server device 650.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The terminology used herein is for the purpose of describing particular embodiments only and is not intended to limit the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A method for automatically managing a hardware fault event occurring in a datacenter system, the method comprising:

collecting, from a server device, via a datacenter management system, hardware fault event analysis corresponding with the hardware fault event, wherein the hardware fault event analysis is organized into a report for the server device suffering from the hardware fault event;

processing, via the datacenter management system, statistical data received from the report for the server device;

identifying, via a BIOS service routine, a source of the hardware fault event;

determining, via the BIOS service routine, whether the hardware fault event is a result of either a correctable or non-correctable error; and performing hardware recovery on the server device based on the processed statistical data to correct the hardware fault event in the server device.

2. The method of claim 1, wherein collecting hardware fault event analysis comprises storing a hardware fault event detection process within a baseboard management controller (BMC) firmware of the server device.

3. The method of claim 1, further comprising identifying the hardware fault event, wherein identifying the hardware fault event comprises identifying at least one of: fault location, fault category, fault type, and fault severity.

4. The method of claim 3, further comprising receiving notification from a BMC of a hardware fault event identification.

5. The method of claim 1, wherein the report comprises a hardware fault event report and a device report.

6. The method of claim 1, further comprising receiving a language-independent open data format that uses human-readable text to express data objects in the report.

7. The method of claim 1, wherein processing the statistical data includes performing a central tendency analysis of at least a portion of the statistical data in the report, wherein the central tendency analysis comprises:

analyzing risk of an operating system and of a software service associated with the hardware fault event, analyzing an orientation of protection of the server device; and predicting trends of the hardware fault event and impact of the hardware fault event.

8. The method of claim 1, further comprising measuring the hardware fault event and creating a risk assessment through a predictive analytics process to create a certificate of diagnosis of the hardware fault event.

9. The method of claim 1, wherein performing the hardware recovery comprises examining a recovery policy for the server device.

10. The method of claim 9, further comprising scheduling a recovery mechanism, wherein the recovery mechanism is scheduled for either instant repair or delayed repair based on the recovery policy.

11. The method of claim 1, further comprising monitoring the hardware fault event for any performance defects of the server device.

12. A system for automatically managing a hardware fault event occurring in a datacenter system, the system comprising:

a plurality of rack servers, each rack server including a server device; and a datacenter management system, wherein the datacenter management system is connected to the server device of each of the plurality of rack servers and is configured to:

collect hardware fault event analysis corresponding with the hardware fault event, wherein the hardware fault event is associated with the server device of one of the plurality of rack servers, and wherein the hardware fault event analysis is organized into a report for the server device of the one of the plurality of rack servers suffering from the hardware fault event;

process statistical data received from the report for the server device;

identify, via a BIOS service routine, a source of the hardware fault event;

determine, via the BIOS service routine, whether the hardware fault event is a result of either a correctable or non-correctable error; and perform hardware recovery based on the evaluated statistical data.

13. The system of claim 12, wherein collecting hardware fault event analysis comprises storing a hardware fault event detection system within a baseboard management controller (BMC) firmware of the server device of the one of the plurality of rack servers suffering from the hardware fault event.

14. The system of claim 12, wherein the datacenter management system is further configured to identify the hardware fault event, wherein identifying the hardware fault event comprises identifying at least one of: fault location, fault category, fault type, and fault severity.

15. The system of claim 14, wherein the datacenter management system is further configured to receive a notification from a BMC of a hardware fault event identification.

16. The system of claim 12, wherein the report comprises a hardware fault event report and a device report.

17. The system of claim 12, wherein the datacenter management system is further configured to receive a language-independent open data format that uses human-readable text to express data objects in the report.

* * * * *